United States Patent
McAnespie

(10) Patent No.: US 7,018,447 B2
(45) Date of Patent: Mar. 28, 2006

(54) METHOD OF CLEANING A ROTARY CONCENTRATOR

(75) Inventor: Donald McAnespie, Tecumseh (CA)

(73) Assignee: Dürr Systems, Inc., Plymouth, MI (US)

( * ) Notice: Subject to any disclaimer, the term of this patent is extended or adjusted under 35 U.S.C. 154(b) by 102 days.

(21) Appl. No.: 10/818,046

(22) Filed: Apr. 5, 2004

(65) Prior Publication Data

US 2005/0217482 A1  Oct. 6, 2005

(51) Int. Cl.
*B01D 53/06* (2006.01)

(52) U.S. Cl. .............................. 95/113; 95/93; 95/143; 95/148; 502/22; 502/34; 502/56

(58) Field of Classification Search .................... 95/92, 95/93, 113, 141, 143, 148; 96/125, 130, 96/143; 502/22, 30, 33, 34, 56
See application file for complete search history.

(56) References Cited

U.S. PATENT DOCUMENTS

| | | | | |
|---|---|---|---|---|
| 3,201,921 | A | * | 8/1965 | Heyes .............................. 95/92 |
| 3,429,808 | A | * | 2/1969 | Smith ........................... 502/25 |
| 3,507,051 | A | * | 4/1970 | Calvert et al. ................. 34/340 |
| 4,026,795 | A | * | 5/1977 | Okamoto et al. .............. 502/33 |
| 4,147,624 | A | * | 4/1979 | Modell ........................ 210/673 |
| 4,194,884 | A | * | 3/1980 | Rounbehler et al. ......... 436/107 |
| 4,562,165 | A | * | 12/1985 | Wilson et al. ................. 502/33 |
| 4,957,715 | A | * | 9/1990 | Grover et al. ............... 423/228 |
| 5,017,202 | A | * | 5/1991 | Ogata et al. .................. 96/125 |
| 5,198,398 | A | * | 3/1993 | van Duijn ..................... 502/56 |
| 5,274,158 | A | * | 12/1993 | Webb et al. ................. 556/472 |
| 5,460,789 | A | | 10/1995 | Wilhelm |
| 5,464,468 | A | * | 11/1995 | Tanaka et al. ................. 96/125 |
| 5,562,442 | A | | 10/1996 | Wilhelm |
| 5,628,968 | A | | 5/1997 | Hug et al. |
| 5,693,123 | A | | 12/1997 | Klobucar |
| 5,700,433 | A | | 12/1997 | Somary |
| 5,788,744 | A | | 8/1998 | Klobucar et al. |
| 6,362,122 | B1 | * | 3/2002 | Cannan ....................... 502/25 |
| 6,365,114 | B1 | | 4/2002 | Marold |
| 6,589,315 | B1 | | 7/2003 | Potzl |
| 6,598,547 | B1 | | 7/2003 | Marold et al. |
| 6,612,833 | B1 | | 9/2003 | Potzl |
| 6,622,780 | B1 | | 9/2003 | Potzl |
| 6,702,876 | B1 | * | 3/2004 | Kim et al. ..................... 95/116 |

OTHER PUBLICATIONS

PCT/US04/38743 International Search Report dated Oct. 6, 2005.

* cited by examiner

*Primary Examiner*—Robert H. Spitzer
(74) *Attorney, Agent, or Firm*—Howard & Howard

(57) ABSTRACT

A method of cleaning the adsorbent media of a rotary concentrator in-situ while maintaining operation of the concentrator, including directing washing liquid into the sectors in the desorb plenum, then rotating the sectors one full revolution plus at least one sector into the desorb plenum to bring a second sector into the desorb plenum, washing the second sector and repeating the cycle until all of the adsorbent media is washed. The method may also include directing washing liquid into sectors not located in the desorb plenum.

7 Claims, 2 Drawing Sheets

METHOD OF CLEANING A ROTARY CONCENTRATOR

BACKGROUND OF THE INVENTION

A rotary concentrator is an air pollution abatement device that removes or captures volatile organic compounds (VOCs) from a contaminated air stream or waste stream, thus cleaning the air stream and letting clean gas pass through the concentrator as disclosed, for example, in U.S. Pat. No. 5,693,123 assigned to the assignee of this application. Sometimes, along with the VOCs, semi-volatile compounds (SOVCs), in the form of a liquid organic mist or entrained particulates is also present in the contaminated air stream. These compounds tend to accumulate on the adsorbent of the concentrator, rendering it ineffective over a period of time. At present, the adsorbent in the sections of the rotary concentrator are washed using a suitable liquid, primarily water, which may include a detergent, by shutting down the rotary concentrator and spraying the washing liquid through the adsorbent of the rotary concentrator either in-situ or by removing and cleaning the adsorbent. As will be understood, this method of cleaning the adsorbent of a rotary concentrator significantly reduces the efficiency of the concentrator requiring the contaminated or waste stream to be stopped or transferred to a second rotary concentrator during the washing cycle.

The method of cleaning the adsorbent of a rotary concentrator of this invention overcomes this problem by washing and cleaning the adsorbent of a rotary concentrator in-situ while continuing to process and clean contaminants from the waste stream greatly increasing the efficiency of the rotary concentrator.

SUMMARY OF THE INVENTION

The method of cleaning the adsorbent of a rotary concentrator of this invention includes a wash spray nozzle directing wash liquid to a limited number of sections or sectors of the rotary concentrator containing adsorbent media, preferably including a spray nozzle located within the desorb supply duct or plenum, directing wash liquid through the sectors of the adsorbent media with the desorb supply plenum in the reverse direction of airflow from the waste or contaminated stream, while maintaining flow of air from the contaminated stream through the remaining sections of the rotary concentrator. The number of wash spray nozzles and the preferred pattern of wash spray will depend upon the adsorbent area to be sprayed. For example, the rotary concentrator can include one or a plurality of wash spray nozzles in the desorb supply duct and one or a plurality of wash spray nozzles circumferentially spaced around the rotary concentrator which direct wash liquid either in the direction of the waste stream to loosen the SVOCs prior to final washing in the desorb supply duct or in the opposite direction. The wash cycle may be initiated either manually or via a preprogrammed PLC. The wheel or rotatable support carrying the adsorbent media preferably stops rotating and the sprays in desorb supply plenum are activated. The spray remains active for a predetermined period of time, dependent upon the contaminants in the waste stream and the time between the wash cycles and the hot clean air directed through the media in the desorb supply plenum may be used to partially dry the media. Once the desorb sector has been washed, the rotatable support begins rotating again bringing sectors of adsorbent media into the desorb supply plenum.

The method of this invention then includes rotating the rotatable support supporting the sectors of adsorbent media one full revolution or 360 degrees plus at least one desorb sector to bring the adsorbent sector opposite the wash spray nozzle in the desorb supply plenum and the rotatable support is stopped again and the spray or sprays are activated to clean the next adsorbent sector or sectors. The wheel again turns through one full revolution plus at least one desorb sector and this process is repeated until all of the adsorbent media is washed at least once. This intermittent method of washing the adsorbent media of a rotary concentrator does not adversely affect the performance of the concentrator because only one small portion of the adsorbent media is washed at a time while the remaining sectors or sections of the adsorbent media continue to remove and capture the VOCs and SVOCs from the waste stream. The method of in-situ cleaning of the adsorbent media of a rotary concentrator of this invention thus maintains the efficiency of the rotary concentrator while cleaning the adsorbent media of SVOCs.

As set forth above, additional wash spray nozzles may be provided in other areas of the adsorbent wheel, which can be added to enhance or further customize the washing scheme. Further, any sprayable liquid can be used to ameliorate washing, including soap or detergent, mild acid, etc. Extensive washing tests have also revealed the usefulness of utilizing suitable mist eliminators in the desorb exhaust stream. This prevents entrainment of excessive liquid in the exhaust stream, which typically includes an oxidizer downstream of the concentrator. The waste liquid collected is drained out of the concentrator housing and is properly disposed of.

DESCRIPTION OF THE PREFERRED EMBODIMENTS

The method of cleaning in-situ adsorbent media of a rotary concentrator of this invention may be utilized with any conventional rotary concentrator having a plurality of sectors each containing adsorbent media. Thus, the disclosed embodiment of the rotary concentrator is for illustrative purposes only and does not limit the method of this invention except as set forth in the appended claims.

Figure 1:
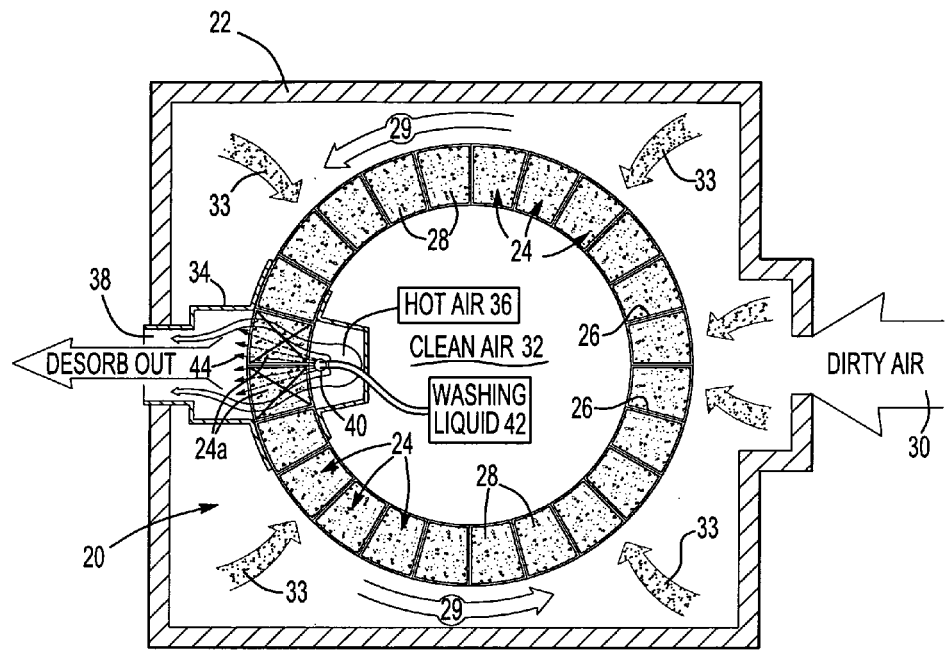
FIG. 1 is a top partially schematic view of a rotary concentrator adapted to perform the method of this invention.
Figure 2:
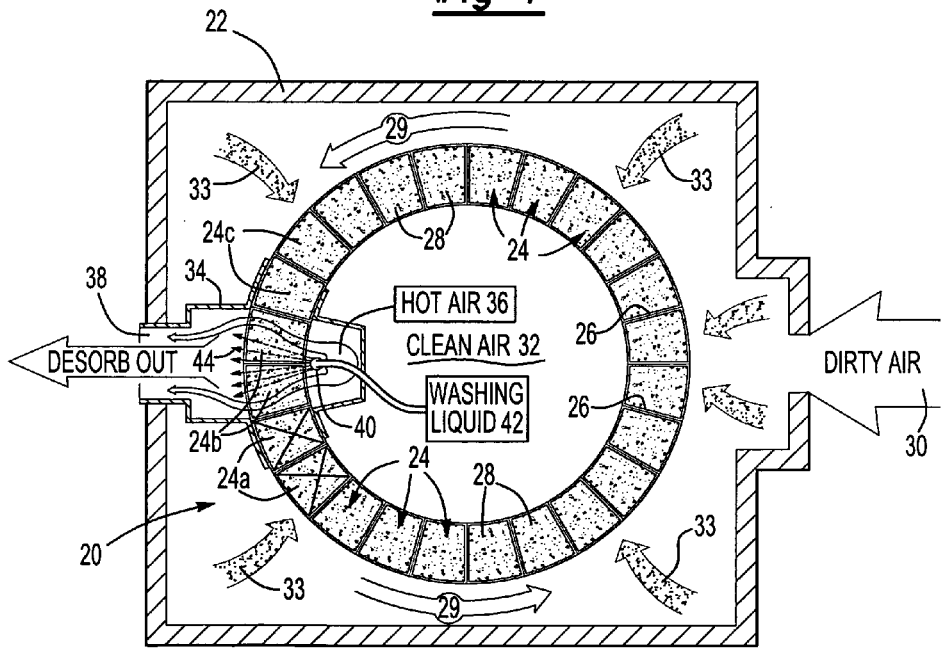
FIG. 2 is a top partially schematic view of FIG. 1 following rotation of the rotatable support illustrating a further step of the method of this invention.

FIGS. 1 and 2 illustrate one embodiment of a rotary concentrator 20 which is typically enclosed within an enclosure or housing 22. The rotary concentrator 20 includes a plurality of segments or sectors 24, each including a housing 26 enclosing adsorbent media 28. As will be understood, the preferred adsorbent media will depend upon the application of the rotary concentrator, but zeolite is a typical adsorbent media for a rotary concentrator of this type. In a typical application, the sectors 24 are arranged in a circle as shown and the sectors 24 are supported on a rotatable support (not shown) to rotate as shown by arrows 29. A waste stream is directed into the enclosure 22 as shown by arrow 30 and the waste stream is then directed through a majority of the sectors 24, as shown by arrows 33, such that clean air 32 is received in the center of the wheel of sectors 24 where it is typically vented to atmosphere. That is, conninainants, such as VOCs and SVOCs, are adsorbed by the adsorbent media 28, such that the clean air 32 may be vented to atmosphere. The rotary concentrator 20 further includes a desorb supply plenum 34 which receives at least one sector for removal of the VOCs from the adsorbent media. In the embodiment shown in FIG. 1, the desorb supply plenum 34 receives two sectors 24a and hot air 36 is directed through the sectors 24a, creating a positive pressure, and the hot air with the contaminants removed from the sectors 24a entrained therein is received through outlet 38 for further cleaning typically by an oxidizer (not shown). As will be understood by those skilled in this art, the sectors 24 are rotated through the desorb supply plenum 34 as shown by arrows 29 for cleaning. The rotation of the sectors 24 may be continuous or sequenced. Thus, a majority of the sectors 24 are removing contaminants from the waste stream while the remainder are being cleaned of contaminants in the desorb supply plenum 34. As thus far, the rotary concentrator 20 may be conventional.

As will be understood by those skilled in this art, the waste stream or dirty air received through inlet 30 typically includes SVOCs which may be in the form of droplets entrained in the dirty air or particulate material which is received in the adsorbent media 28 and which will remain in the adsorbent media following the desorb cycle in the desorb supply plenum 34. As this material builds up in the adsorbent media 28, the efficiency of the rotary concentrator decreases, requiring periodic washing of the adsorbent media 28. At present, washing of the adsorbent media typically requires shutting down the rotary concentrator 20, washing the adsorbent media 28 with washing fluid (water with or without soap or detergent acid or other suitable additives). The adsorbent media 28 is then dried and the rotary concentrator 20 is again ready for use.

The method of cleaning the adsorbent media of this invention, eliminates the requirement for shutting down the rotary concentrator 20 and permits washing and cleaning in-situ while maintaining operation of the rotary concentaror 20 to remove VOCs from the waste stream. In a preferred embodiment of the method of cleaning in-situ the adsorbent media of this invention, a nozzle 40 connected to a source of washing liquid 42 is located in the desorb supply plenum 34 for directing washing liquid into the sectors 24a located in the dcsorb supply plenum 34 as shown by arrows 44 in FIG. 1. As will be understood, the desorb plenum 34 may include a plurality of nozzles 40 directing hot or room temperature washing liquid 42 outwardly, as shown, or inwardly depending upon the application and the number of sectors 24 in the desorb plenum 34. During the washing cycle, the majority of the sectors 24 are still receiving dirty air through the inlet 30 and the dirty air is received through the majority of the sectors 24 as shown by arrows 33. That is, the rotary concentrator 20 maintains its efficiency by receiving air with entrained contaminants through a substantial majority of the sectors 24 and the clean air 32 is directed to atmosphere. The hot air 36 may be continued during the washing cycle and the hot air may then be utilized to partially dry the adsorbent media following washing. The hot air also heats the washing liquid. Alternatively, the hot air can be shut off during the washing cycle and turned on after washing.

The next step in the method of cleaning in-situ the adsorbent media in the sectors is to rotate the sectors 24 through a full cycle or 360 degrees plus the number of sectors 24 receivable in the desorb supply plenum 34 or at least one sector. Thus, in the embodiment of the rotary concentrator 20 shown in FIG. 2, two further sectors 24b are received in the desorb supply plenum 34 following rotation of the sectors 24 through a full cycle plus two sectors 24b as shown in FIG. 2. The washing cycle is then repeated, directing washing liquid through the nozzle or nozzles 40 from the source of washing liquid 42, removing the SVOCs from the adsorbent media in the sectors 24b as described above. In a preferred embodiment of the method of this invention, the rotation of the sectors 24 is stopped during the washing cycle.

The washing cycle is then repeated until the adsorbent media 28 in all of the sectors 24 is washed. That is, following washing of the adsorbent media 28 in the sectors 24b is completed, the sectors 24 are again rotated through a full cycle or 360 degrees plus sectors 24c, receiving the sectors 24c in the desorb supply plenum 34, where the adsorbent media 28 in the sectors 24c is washed, etc. until all of the sectors are fully cleaned. The purpose of rotating the sectors 24 through a full cycle plus the sectors receivable in the desorb supply plenum 34 is to avoid loss of efficiency of the adsorbent media 28. Because in the preferred embodiment of the method of this invention, the rotation of the sectors 24 is stopped during washing, indexing the sectors 24 for washing in sequence, the efficiency of the rotary concentrator would be compromised. That is, all the adsorbent media would become saturated with washing fluid, significantly reducing the efficiency of the rotary concentrator 20.

Figure 3:
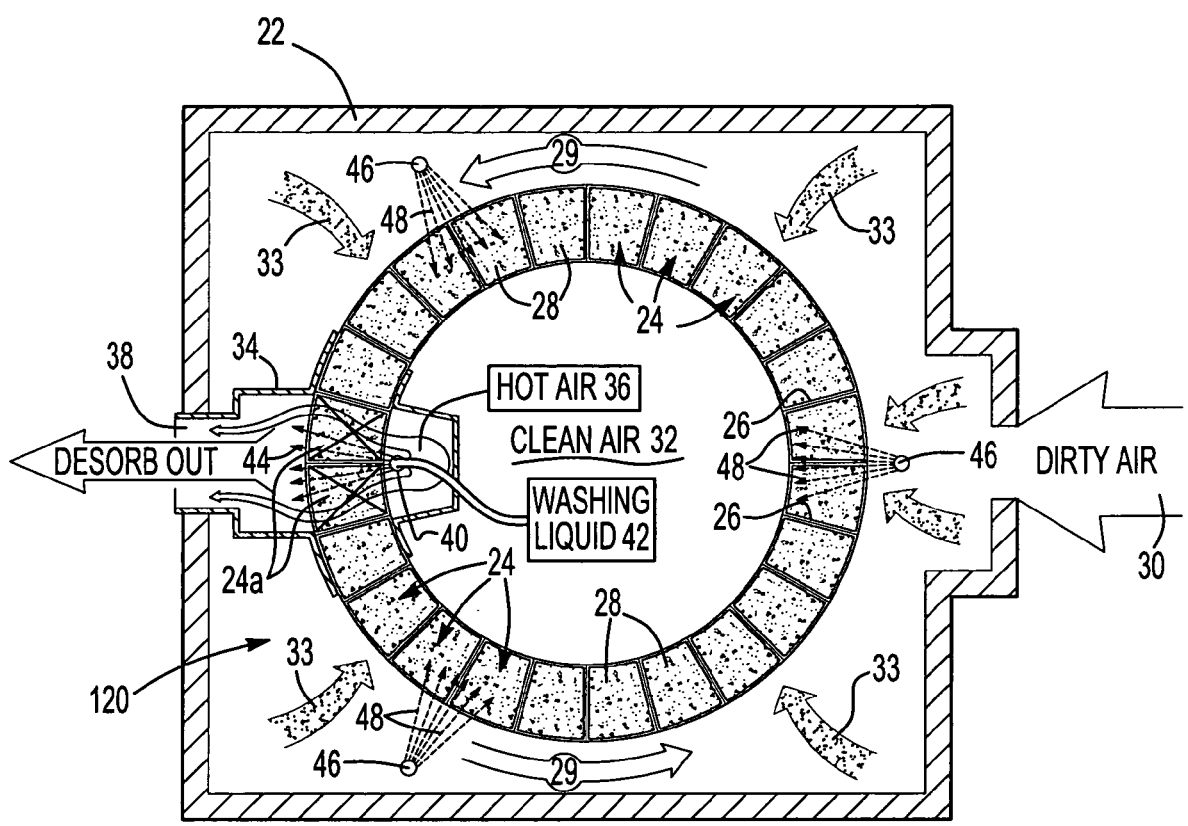
FIG. 3 is a top partially schematic view of an alternative embodiment of the rotary concentrator shown in FIGS. 1 and 2.

FIG. 3 illustrates an alternative embodiment of a rotary concentrator for performing the method of cleaning in-situ the adsorbent media 28 in the sectors 24. The embodiment of the rotary concentrator 120 shown in FIG. 3 may be identical to the rotary concentrator 20 shown in FIGS. 1 and 2, except that the rotary concentrator 120 in FIG. 3 includes a plurality of circumferentially spaced nozzles 46 connected to the source of washing liquid 42 directing washing liquid 48 into the sectors 24 as shown in FIG. 3. The additional washing shown in FIG. 3 is optional and may be utilized continuously or sequentially to loosen or wash liquid or particulate contaminants prior to the washing cycle in the desorb supply plenum 34. All other components of the rotary concentrator 120 shown in FIG. 3 may be identical to the rotary concentrator 20 shown in FIGS. 1 and 2 and are therefore numbered the same. Further, the method of cleaning the adsorbent media 28 of the sectors 24 may be otherwise identical to the method described above with regard to FIGS. 1 and 2. As set forth above, additional washing sprays in other areas of the wheel of sectors 24 can be added to enhance or further customize the washing scheme.

Extensive washing tests have also revealed the usefulness of using suitable mist eliminators in the desorb exhaust stream. This prevents entrainment of excessive liquid to the devices down stream of the concentrator, such as an oxidizer typically used to oxidize the contaminants received from the outlet 38 of the desorb supply plenum 34. The waste liquid collected is drained out of the concentrator housing and properly disposed of.

Having described preferred embodiments of the method of cleaning in-situ adsorbent media of a rotary concentrator, it will be understood that various modifications may be made within the purview of the appended claims. As set forth above, the method of this invention may be utilized with any conventional rotary concentrator and is not limited to the embodiment of the rotary concentrator shown in the figures. Further, the additional nozzles 46 may be located within the wheel of sectors 24 and any number may be utilized. Having described preferred embodiments, the invention is now claimed as follows.

The invention claimed is:

1. A method of cleaning in-situ adsorbent media of a rotary concentrator, said rotary concentrator including a plurality of sectors, each sector containing adsorbent media, said plurality of sectors supported on a rotatable support, a waste gas stream containing contaminants directed through a majority of said sectors, removing contaminants from said waste stream, a desorb supply plenum receiving at least one of said sectors, a clean gas stream directing clean gas through said at least one sector in said desorb supply plenum removing contaminants from adsorbent media in said at least one sector, and a spray nozzle in said desorb supply plenum connected to a source of washing liquid adapted to direct washing liquid into said at least one sector to remove further contaminants from adsorbent media in said at least one sector, said method comprising the following steps:
   (a) directing washing liquid into a first of said at least one sector located in said desorb supply plenum, removing contaminants from adsorbent media in said first at least one sector in said desorb supply plenum while directing said waste gas stream through a majority of said sectors located outside of said desorb supply plenum;
   (b) rotating said rotatable support through one full revolution plus at least one sector to bring a second at least one sector into said desorb supply plenum;
   (c) directing washing liquid into said second at least one sector in said desorb supply plenum, removing contaminants from adsorbent media in said second at least one sector, while continuing to direct said waste gas stream through a majority of sectors located outside said desorb supply plenum; and
   (d) repeating steps (b) and (c) to direct washing liquid into all of said sectors, thereby washing adsorbent media in all of said sectors while continuing to direct said waste gas stream through a majority of said sectors.

2. The method of cleaning in-situ adsorbent media of a rotary concentrator as defined in claim 1, wherein said method includes directing washing liquid into said at least one sector in said desorb supply plenum, then directing hot air through said at least one sector.

3. The method of cleaning in-situ adsorbent media of a rotary concentrator as defined in claim 2, wherein said method includes directing hot air through said at least one sector in said desorb supply plenum while directing washing liquid through said at least one sector.

4. The method of cleaning in-situ adsorbent media of a rotary concentrator as defined in claim 1, wherein said method includes holding rotation of said rotatable support while directing washing liquid into said at least one sector in said desorb supply plenum.

5. The method of cleaning in-situ adsorbent media of a rotary concentrator as defined in claim 1, wherein said method includes directing said washing liquid into said at least one sector in a direction opposite to receipt of said waste gas stream through a majority of sectors.

6. The method of cleaning in-situ adsorbent media of a rotary concentrator as defined in claim 1, wherein said method includes directing washing liquid into a plurality of sectors located outside of said desorb supply plenum.

7. The method of cleaning in-situ adsorbent media of a rotary concentrator as defined in claim 1, wherein said method includes locating a first sector in said desorb supply plenum, rotating said rotatable support through one full revolution plus one sector to bring a second sector adjacent to said first sector into said desorb supply plenum, washing said second sector and repeating the washing cycle to wash all of said sectors.

* * * * *